US011762084B2

United States Patent
Poiger et al.

(10) Patent No.: US 11,762,084 B2
(45) Date of Patent: Sep. 19, 2023

(54) VEHICLE RADAR SYSTEM (71) Applicant: Arriver Software AB, San Diego, CA (US)

(72) Inventors: Walter Poiger, Bad Neustadt (DE); Juergen Maisel, Grafing Bei Muenchen (DE)

(73) Assignee: Arriver Software AB, Linköping (SE)

( * ) Notice: Subject to any disclaimer, the term of this patent is extended or adjusted under 35 U.S.C. 154(b) by 372 days.

(21) Appl. No.: 16/314,884

(22) PCT Filed: Jul. 7, 2017

(86) PCT No.: PCT/EP2017/067147
§ 371 (c)(1),
(2) Date: Jan. 3, 2019

(87) PCT Pub. No.: WO2018/007618
PCT Pub. Date: Jan. 11, 2018

(65) Prior Publication Data
US 2019/0204435 A1 Jul. 4, 2019

(30) Foreign Application Priority Data
Jul. 8, 2016 (EP) .................................... 16178640

(51) Int. Cl.
*G01S 13/87* (2006.01)
*G01S 13/34* (2006.01)
(Continued)

(52) U.S. Cl.
CPC .......... *G01S 13/878* (2013.01); *G01S 13/343* (2013.01); *G01S 13/345* (2013.01);
(Continued)

(58) Field of Classification Search
CPC .... G01S 13/878; G01S 13/343; G01S 13/345; G01S 13/4445; G01S 13/584;
(Continued)

(56) References Cited

U.S. PATENT DOCUMENTS 3,965,475 A * 6/1976 Deerkoski ........... G01S 13/4409
343/781 CA
4,771,290 A * 9/1988 Storey, Jr. ................ G01S 11/04
342/458

(Continued)

FOREIGN PATENT DOCUMENTS

DE 10 2009 047 390 A1 6/2011
DE 102009047390 A1 * 6/2011 ......... B60R 21/0134
(Continued)

OTHER PUBLICATIONS

International Search Report and Written Opinion of PCT/EP2017/067147, dated Dec. 6, 2017.
(Continued)

*Primary Examiner* — Nuzhat Pervin
(74) *Attorney, Agent, or Firm* — Arriver Software AB (57) ABSTRACT

A vehicle radar system (3) and method including a first and second radar sensor arrangement (4a, 4b). Each radar sensor arrangement (4a, 4b) includes at least two transmitter antenna devices (10a1, 10a2) and at least two receiver antenna devices (13a1, 13a2, 13a3, 13a4), where each receiver antenna device (13a1, 13a2, 13a3, 13a4) has a corresponding boresight extension (46a, 46b) that is perpendicular to an antenna plane (57). Each receiver antenna device (13a1, 13a2, 13a3, 13a4) has a corresponding antenna radiation pattern (47a, 47b) that has a lower gain (48a, 48b) in its boresight extension (46a, 46b) than at a certain corresponding first maximum gain azimuth angle ($\varphi_{1a}$, $\varphi_{1b}$) where there is a first maximum gain (49a, 49b). Each radar sensor arrangement (4a, 4b) is mounted such that
(Continued)

each first maximum gain (49a, 49b) is directed along a corresponding first maximum gain extension (51a, 51b), such that an overlap part (56) of the antenna radiation patterns (47a, 47b) is formed.

14 Claims, 6 Drawing Sheets

(51) Int. Cl.
    *G01S 13/44*     (2006.01)
    *G01S 13/58*     (2006.01)
    *G01S 13/931*     (2020.01)
    *G01S 13/50*     (2006.01)
    *G01S 13/72*     (2006.01)

(52) U.S. Cl.
    CPC ........ *G01S 13/4445* (2013.01); *G01S 13/584* (2013.01); *G01S 13/931* (2013.01); *G01S 13/505* (2013.01); *G01S 13/72* (2013.01); *G01S 2013/93271* (2020.01)

(58) Field of Classification Search
    CPC ......... G01S 13/931; G01S 2013/93271; G01S 13/505; G01S 13/72
    USPC .......................................................... 342/59
    See application file for complete search history.

(56) References Cited

U.S. PATENT DOCUMENTS

| | | | | |
|---|---|---|---|---|
| 5,075,863 A * | 12/1991 | Nagamune | ............ | G01S 13/288 702/159 |
| 5,351,060 A * | 9/1994 | Bayne | ............ | H01Q 3/20 342/359 |
| 5,523,764 A * | 6/1996 | Martinez | ............ | H01Q 3/2605 342/372 |
| 6,185,201 B1 * | 2/2001 | Kiyanagi | ............ | H04J 1/00 455/315 |
| 6,621,411 B2 * | 9/2003 | McCarthy | ............ | E05B 85/12 340/506 |
| 8,527,003 B2 * | 9/2013 | Gupta | ............ | H01Q 15/244 370/240 |
| 9,454,906 B2 * | 9/2016 | Mühlenberg | ............ | G01S 7/2813 |
| 9,548,530 B2 * | 1/2017 | Kubo | ............ | H01Q 1/48 |
| 9,787,339 B2 * | 10/2017 | Shen | ............ | H04B 17/318 |
| 10,503,883 B1 * | 12/2019 | Gillian | ............ | G06F 18/28 |
| 2004/0040764 A1 * | 3/2004 | Polak | ............ | H01Q 1/3233 180/169 |
| 2004/0169663 A1 * | 9/2004 | Bernier | ............ | G06T 15/04 345/629 |
| 2005/0225481 A1 * | 10/2005 | Bonthron | ............ | H01Q 21/0093 342/175 |
| 2006/0152405 A1 * | 7/2006 | Egri | ............ | G01S 13/878 342/437 |
| 2006/0164294 A1 * | 7/2006 | Gottwald | ............ | H01Q 25/00 342/107 |
| 2008/0002652 A1 * | 1/2008 | Gupta | ............ | H01Q 15/244 343/893 |
| 2013/0321196 A1 * | 12/2013 | Binzer | ............ | G01S 13/931 342/70 |
| 2015/0002329 A1 * | 1/2015 | Murad | ............ | G01S 7/4004 342/155 |
| 2015/0260828 A1 * | 9/2015 | Ossowska | ............ | G01S 13/931 342/162 |
| 2015/0318624 A1 * | 11/2015 | Schantz | ............ | H01Q 1/273 343/867 |
| 2015/0357706 A1 * | 12/2015 | Kubo | ............ | H01Q 1/48 343/848 |
| 2016/0049824 A1 * | 2/2016 | Stein | ............ | H02J 50/20 320/108 |
| 2016/0146925 A1 * | 5/2016 | Millar | ............ | G01S 13/44 342/113 |
| 2017/0309997 A1 * | 10/2017 | Alland | ............ | H01Q 21/29 |
| 2021/0013606 A1 * | 1/2021 | Longman | ............ | H01Q 3/34 |

FOREIGN PATENT DOCUMENTS

| | | | | |
|---|---|---|---|---|
| DE | 102010064346 A1 | | 7/2012 | |
| DE | 102010064346 A1 * | | 7/2012 | ............. G01S 13/87 |
| DE | 102012021240 A1 * | | 4/2014 | ........... G01S 13/343 |
| DE | 102012021240 A1 | | 4/2014 | |
| EP | 1566657 A2 * | | 8/2005 | ........... G01S 13/878 |
| EP | 2 2023 156 A2 | | 2/2009 | |
| EP | 2023156 A2 * | | 2/2009 | ............. G01S 13/48 |
| EP | 1 566 657 B1 | | 6/2011 | |
| EP | 2333578 A2 | | 6/2011 | |
| EP | 2735884 A1 * | | 5/2014 | ........... G01S 7/2813 |
| EP | 2 876 460 A1 | | 5/2015 | |
| EP | 2876460 A1 * | | 5/2015 | ........... G01S 13/343 |
| EP | 2 735 884 B1 | | 8/2016 | |
| GB | 2350739 A * | | 12/2000 | ............. G01S 13/34 |
| GB | 2876460 A1 * | | 5/2015 | ........... G01S 13/343 |
| JP | 07235822 A * | | 9/1995 | |
| WO | WO-2017205799 A1 * | | 11/2017 | ........... G01S 13/003 |

OTHER PUBLICATIONS

European Search Report—EP16178640—Search Authority—Munich—dated Mar. 9, 2017.
Partial European Search Report—EP16178640—Search Authority—Munich—dated Dec. 2, 2016.
Yao H., et al., "Moving-Target Detection and Parameter Estimation Method for Dual-Channel SAR", Systems Engineering and Electronics No. 2, 5 Pages, Feb. 15, 2009.

* cited by examiner

VEHICLE RADAR SYSTEM

CROSS-REFERENCE TO RELATED APPLICATIONS

This application is a 35 U.S.C. § 371 national phase of PCT International Application No. PCT/EP2017/067147, filed Jul. 7, 2017, which claims the benefit of priority under 35 U.S.C. § 119 to European Patent Application No. 16178640.5, filed Jul. 8, 2016, the contents of which are incorporated herein by reference in their entirety.

FIELD OF THE INVENTION

The present disclosure relates to a vehicle radar system with a first radar sensor arrangement and a second radar sensor arrangement. Each radar sensor arrangement includes at least two transmitter antenna devices and at least two receiver antenna devices.

BACKGROUND

Many vehicle radar systems include a forward-looking radar transceiver provided in a forward-looking radar sensor arrangement as singular radar solution or in combination with a camera system (Mono or Stereo) to detect obstacles like cars, motorcycles, bicycles or pedestrians. Two corner radar transceivers provided in corresponding corner radar sensor arrangements may additionally be installed as well. The detections of all sensors will be fused to tracked objects, which are used for functions like i.e. Autonomous (or Automatic) Emergency Braking (AEB) or for Adaptive Cruse Control (ACC). The fusion of those objects can be performed by a control unit located in one of the radar sensor arrangements, or in a centralized RCU (Radar Control Unit) or ADAS (Advanced Drive Assistance System) control unit.

Forward-looking looking radar transceiver characteristics are for example to have a mid-range mode, approximately 150 m to 180 m and a FoV (Field of View) angle of about ±18° to ±25° and a short-range mode, approximately 50 m to 60 m, with a FOV of about ±75° to ±90°. Corner radar transceiver characteristics are for example to have a FoV angle of about ±140° to ±150° depending on the physical limitation of the antenna construction.

The overlapping FoV's of the forward-looking looking radar transceiver and the corner radar transceivers cover a wide angular coverage of the whole front and side parts of the vehicle.

Each radar transceiver must transmit the digital radar data as raw data, i.e. time domain data, or any other form of higher density of the signal information, detections (pre-targets) or tracked objects via a bus interface to the control unit, which is arranged to compute the data and run the function algorithms (AEB, ACC etc.).

In case of raw data transfer, low level radar signal processing capability is needed in the control unit as well. The interface bus used must be suitable for transmitting the amount of data generated and allow low latency, especially if tracked objects are forwarded to the fusion ADAS ECU or to radar sensor arrangement.

It would be desirable to have a less complicated arrangement that still provides an adequate coverage with regard to the required FoV and range, combining a wide FoV in short-range mode and a wide range in boresight of the vehicle in mid-range mode.

The object of the present disclosure is thus to provide a less complicated vehicle radar system that still provides an adequate coverage with regard to the required FoV and range.

This object is obtained by embodiments of a vehicle radar system including a first radar sensor arrangement and a second radar sensor arrangement. Each radar sensor arrangement includes at least two transmitter antenna devices and at least two receiver antenna devices. Each receiver antenna device has a corresponding boresight extension that is perpendicular to an antenna plane. Each receiver antenna device has a corresponding antenna radiation pattern, where each antenna radiation pattern has a lower gain in its boresight extension than at a certain corresponding first maximum gain azimuth angle with respect to the corresponding boresight extension, where there is a first maximum gain. Each radar sensor arrangement is mounted such that each first maximum gain is directed along a corresponding first maximum gain extension, such that an overlap part of the antenna radiation patterns is formed.

This object is obtained by an exemplary method for a vehicle radar system that uses at least two receiver antenna devices. Each receiver antenna device has a corresponding boresight extension that is perpendicular to an antenna plane. For each receiver antenna device, the method includes radiating an antenna radiation pattern that has a lower gain in its boresight extension than at a certain corresponding first maximum gain azimuth angle with respect to the corresponding boresight extension, where there is a first maximum gain. Each radar sensor arrangement is mounted to a vehicle such that each first maximum gain is directed along a corresponding first maximum gain extension, such that an overlap part of the antenna radiation patterns is formed.

According to an example, the first maximum gain extensions are mutually parallel.

According to another example embodiment, the radar sensor arrangements are arranged to be mounted to a vehicle, having a forward direction (D), such that the first maximum gain extensions extend in the forward direction, and such that the corresponding first maximum gain azimuth angle is formed between the corresponding boresight extension and the corresponding first maximum gain extension.

According to another example embodiment, each antenna radiation pattern has a lower gain in its boresight extension than at a second maximum gain azimuth angle where there is a second maximum gain.

According to another example embodiment, the transmitter antenna devices are arranged to transmit by use of a first relative antenna radiation pattern and by use of a second relative antenna radiation pattern diagram. The first relative antenna radiation pattern is obtained by feeding two transmitter antenna devices in phase, while the second relative antenna radiation pattern diagram is obtained by feeding two transmitter antenna devices out of phase with each other.

According to another example embodiment, the vehicle radar system is constituted by a radar system where the transmitter antenna devices are arranged to transmit Frequency Modulated Continuous Wave (FMCW) chirp signals.

Other examples are disclosed in the specification and appended drawings.

By the present disclosure, a special designed Radar Front End (RFE) is provided, having an antenna construction and digital beam forming technique that provides a maximum gain in the direction of about 30° in relation to boresight.

A number of advantages are obtained by embodiments of the present disclosure. For example:

Only two corner radar sensors in the front are needed

A physically extended aperture of the radar transceivers is obtained, which leads to a higher angular resolution in the overlap FoV area.

Multi-path effects are at least significantly reduced.

BRIEF DESCRIPTION OF THE DRAWINGS

The present disclosure will now be described more in detail with reference to the appended drawings, where.

DETAILED DESCRIPTION

Figure 1:
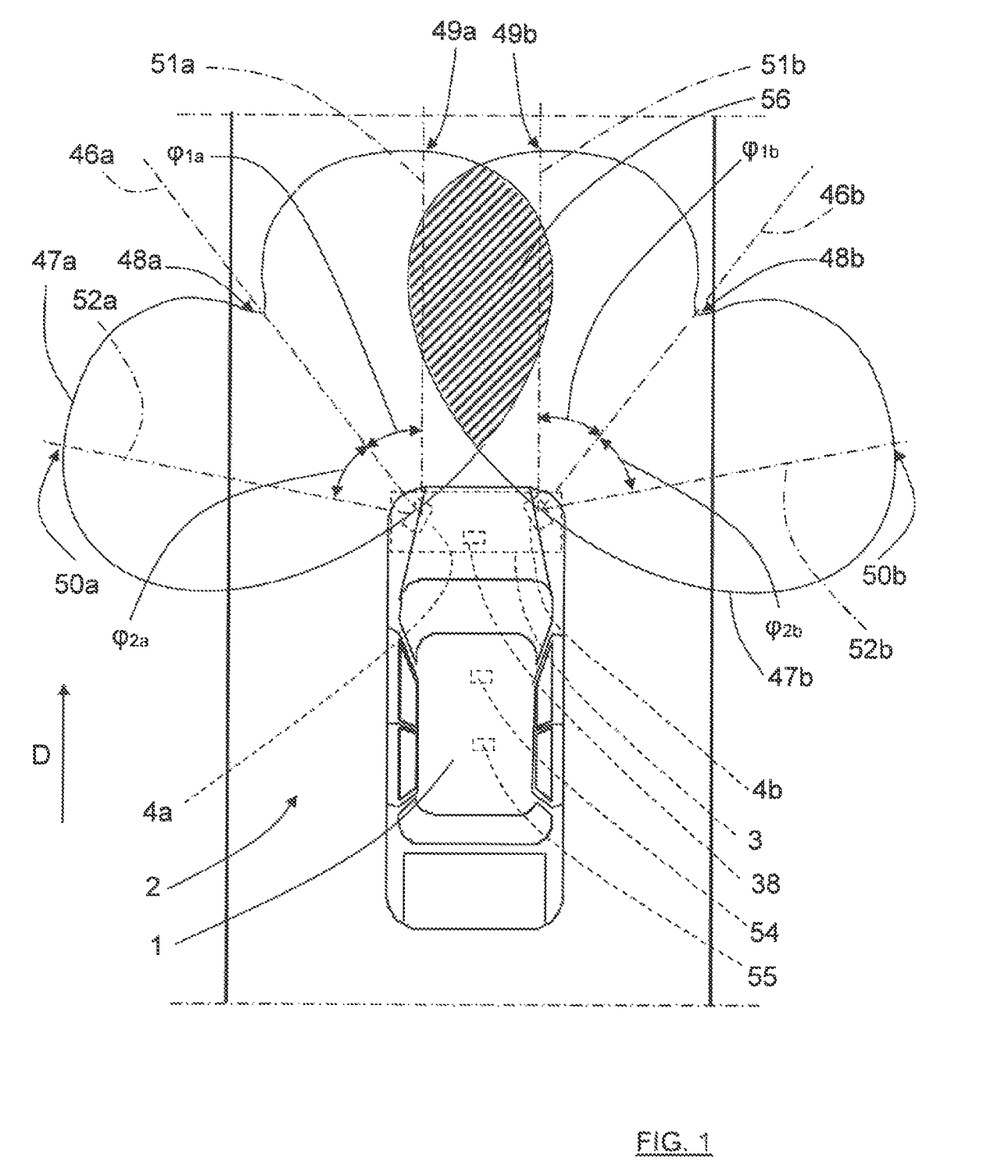
FIG. 1 shows a schematic top view of a vehicle.
Figure 2:
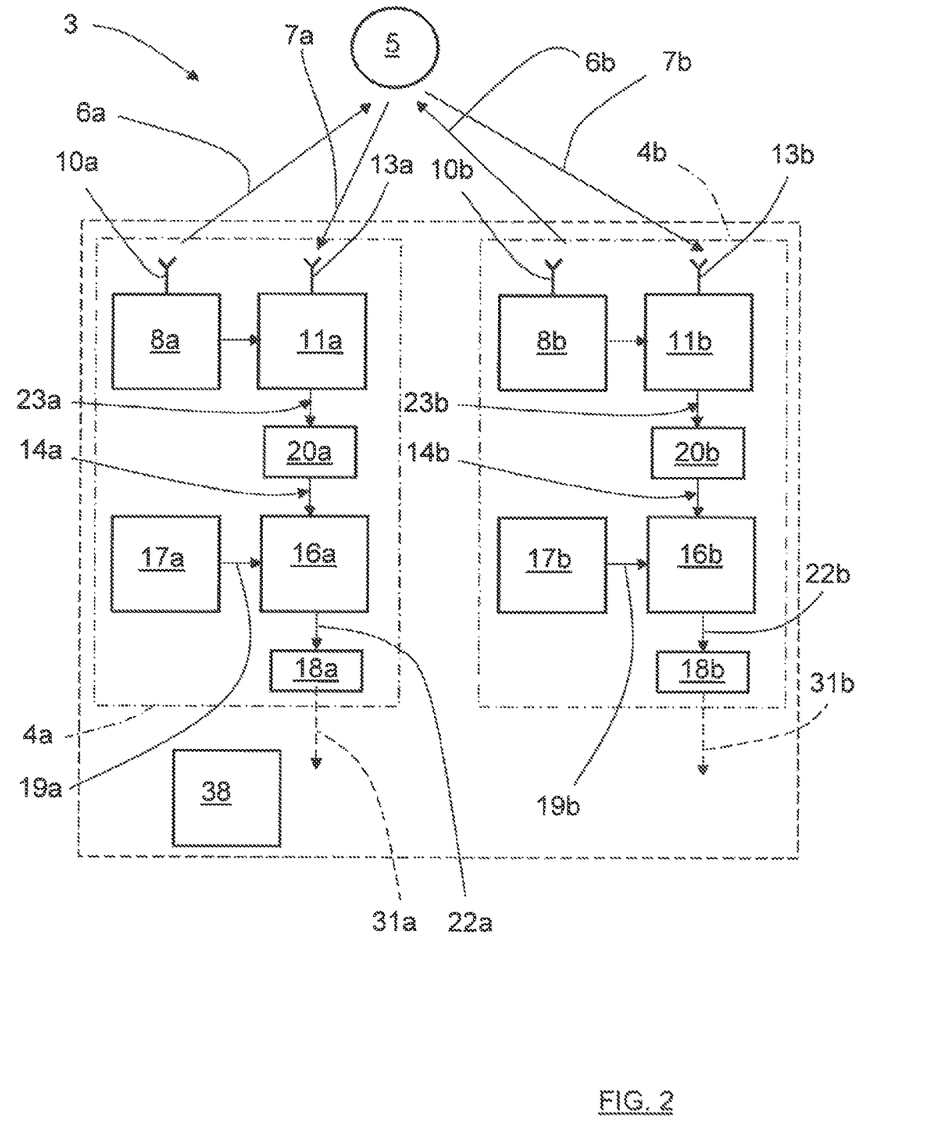
FIG. 2 shows a simplified schematic of a vehicle radar system.

FIG. 1 schematically shows a top view of a vehicle 1 arranged to run on a road 2 in a forward direction D, where the vehicle 1 includes a vehicle radar system 3. The vehicle radar system 3 includes a first radar sensor arrangement 4a and a second radar sensor arrangement 4b. With reference also to FIG. 2, showing a simplified schematic of radar system 3, the radar sensor arrangements 4a, 4b are arranged to distinguish and/or resolve single targets from the surroundings by transmitting signals 6a, 6b and receiving reflected signals 7a, 7b and using a Doppler effect in a previously well-known manner. The vehicle radar system 3 further includes a main control unit 38 and is arranged to provide azimuth angles of possible target objects 5 by simultaneously sampling and analyzing phase and amplitude of the received signals 7a, 7b.

In principle it is not limited radar sensors with azimuth detection capabilities it also applies to radar antenna designs which covers horizontal and vertical FoV (Field of View).

As shown in FIG. 2, the vehicle radar system 3 includes a first radar sensor arrangement 4a and a second radar sensor arrangement 4b, where each radar sensor arrangement 7a, 7b is arranged for generating and transmitting sweep signals in the form of FMCW (Frequency Modulated Continuous Wave) chirp signals 6a, 6b of a previously known kind, and to receive reflected signals 7a, 7b, where the transmitted chirp signals 6a, 6b have been reflected by an object 5.

The first radar sensor arrangement 4a includes a first transmitter arrangement 8a with a first transmitter antenna arrangement 10a, a first receiver arrangement 11a with a first receiver antenna arrangement 13a, a first Analog to Digital Converter (ADC) arrangement 16a and a first sampling and timing arrangement 17a. Correspondingly, the second radar sensor arrangement 4b includes a second transmitter arrangement 8b with a second transmitter antenna arrangement 10b, a second receiver arrangement 11b with a second receiver antenna arrangement 13b, a second Analog to Digital Converter (ADC) arrangement 16b and a second sampling and timing arrangement 17b.

Figure 3:
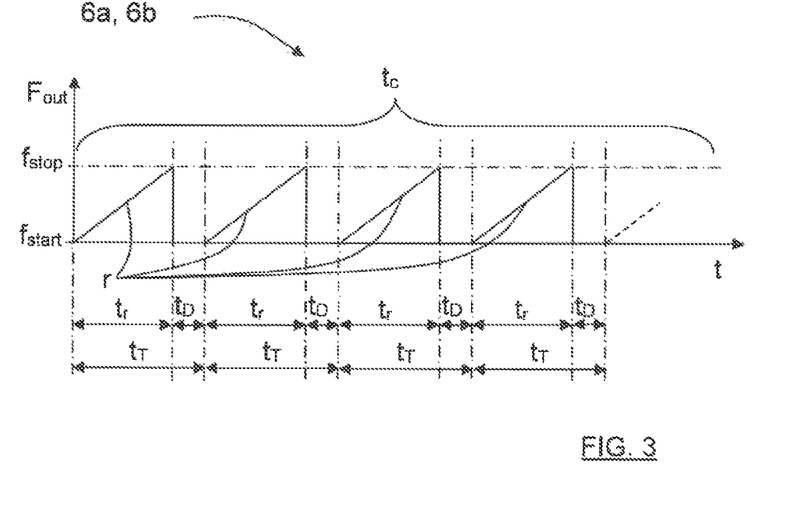
FIG. 3 shows a chirp signal.

As shown in FIG. 3, a transmitted FMCW chirp signal 6a, 6b is in the form of a continuous sinusoid where the output frequency $F_{out}$ varies from a first frequency $f_{start}$ to a second frequency $f_{stop}$ over the course of a ramp r, where each chirp signal 6a, 6b includes repeating cycles of a plurality of frequency ramps r. There the magnitude of the first frequency $f_{start}$ falls below the magnitude of the second frequency $f_{stop}$.

A cycle for a chirp signal 6a, 6b lasts for a certain cycle time $t_c$, each ramp r lasts a certain ramp time $t_r$, having a ramp period time $t_T$. Between two consecutive ramps of the chirp signal 4a, 4b there is a delay time $t_D$. The FMCW chirp signals 6a, 6b may be transmitted with a mutual time difference, such that they are transmitted in an interleaved manner.

Referring back to FIG. 2, the reflected signals 7a, 7b are received by the receivers 11a, 11b via the receiver antenna arrangements 13a, 13b. The received signals 7a, 7b, thus constituted by reflected radar echoes, are then mixed with the transmitted chirp signals 6a, 6b in the receivers 11a, 11b.

In this way, IF (Intermediate Frequency) signals 23a, 23b are acquired are acquired and filtered in corresponding IF filters 20a, 20b such that filtered IF signals 14a, 14b are acquired.

The difference frequency of the filtered IF signals 14a, 14b relates to the target distance and are transferred to the corresponding ADC arrangement 16a, 16b, where the filtered IF signals 14a, 14b are sampled at a certain predetermined sampling frequency $f_s$ and converted to digital signals 22a, 22b, the sampling frequency $f_s$ being provided in the form of a sampling and timing signal 19a, 19b produced by the corresponding sampling and timing arrangement 17a, 17b.

Each radar sensor arrangement 4a, 4b further includes a DSP (Digital Signal Processor) arrangement 18a, 18b that is adapted for radar signal processing by use of a first FFT (Fast Fourier Transform) to convert the digital signals 22a, 22b to a range domain, and a second FFT to combine the results from successive chirp signal ramps into the Doppler domain. The two-dimensional spectrum of the Range-Doppler matrices that results are forwarded for further processing as indicated with dashed arrows 31a, 31b. The vehicle radar system 3 suitably includes a main control unit 38 that is arranged to control the working of certain components in the vehicle radar system 3.

Figure 4:
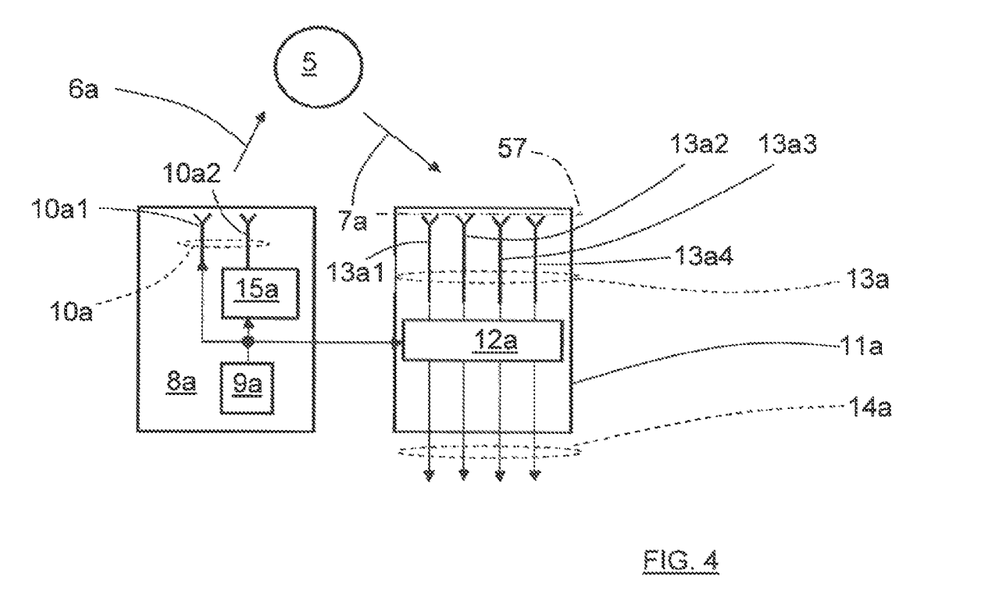
FIG. 4 shows a simplified schematic of a transmitter arrangement and receiver arrangement.

In FIG. 4, the first transmitter arrangement 8a and the first receiver arrangement 11a are shown more in detail; it is to be understood that the second transmitter arrangement 8b and the second receiver arrangement 11b have a similar design. The first transmitter arrangement 8a includes a signal generator 9a that is arranged to generate FMCW (Frequency Modulated Continuous Wave) chirp signals as described previously. The first transmitter antenna arrangement 10a includes a first transmitter antenna device 10a1 and a second transmitter antenna device 10a2, each transmitter antenna device 10a1, 10a2 either being constituted by one antenna element or by an array of antenna elements.

The first receiver arrangement 11a includes a receiver mixer 12a and the first receiver antenna arrangement 13a includes a first receiver antenna device 13a1, a second receiver antenna device 13a2, a third receiver antenna device 13a3 and a fourth receiver antenna device 13a4. In the same way as for the transmitter antenna devices 10a1, 10a2, each receiver antenna device 13a1, 13a2, 13a3, 13a4 may be constituted by one antenna element or by an array of antenna elements.

The transmitted signals 6a, 6b are reflected at the target object 5, and the reflected signals 7a, 7b are received by the receiver arrangement 11a. The received signals 7a, 7b, thus constituted by reflected radar echoes, are mixed with the transmitted signal 6a, 6b in the receiver mixer 12, such that the four corresponding IF (Intermediate Frequency) signals 14 are acquired. The difference frequency of the resulting IF signals relates to the target distance. These IF signals are later filtered as described previously with reference to FIG. 2.

Figure 10:
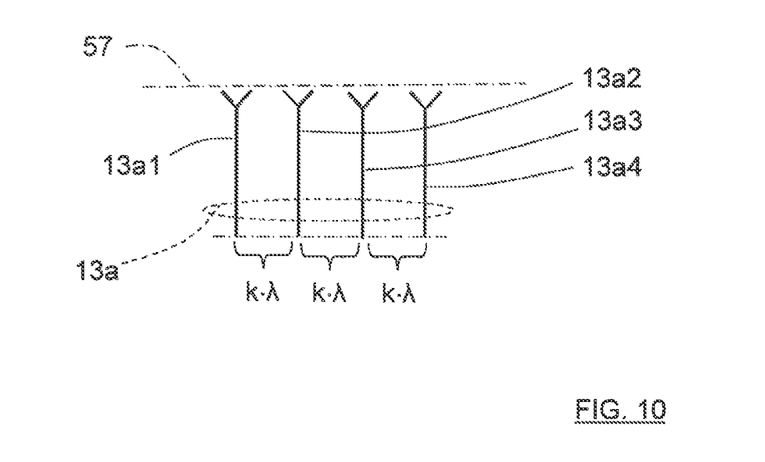
FIG. 10 shows a simplified view of four receiver antenna devices.

With reference also to FIG. 1, each receiver antenna device 13a1, 13a2, 13a3, 13a4 has a corresponding boresight extension 46a, 46b that is perpendicular to an antenna plane 57 (only shown in FIG. 4 and FIG. 10).

According to the present disclosure, each receiver antenna device 13a1, 13a2, 13a3, 13a4 has a corresponding antenna radiation pattern 47a, 47b (only one antenna radiation pattern indicated for each radar sensor arrangement 4, 5 in FIG. 1) that has a lower gain 48a, 48b in its boresight extension 46a, 46b than at a certain corresponding first maximum gain azimuth angle $\varphi_{1a}$, $\varphi_{1b}$ with respect to the corresponding boresight extension 46a, 46b, where there is a first maximum gain 49a, 49b, and a second maximum gain azimuth angle $\varphi_{2a}$, $\varphi_{2b}$ where there is a second maximum gain 50a, 50b. Each first maximum gain 49a, 49b presents a maximum gain at a positive angle $\varphi_{1a}$, $\varphi_{1b}$ from the corresponding boresight extension 46a, 46b each second maximum gain 50a, 50b presents a maximum gain at a negative angle $\varphi_{2a}$, $\varphi_{2b}$ from the corresponding boresight extension 46a, 46b. Due to radiation pattern symmetry, for each antenna radiation pattern 47a, 47b, first maximum gain azimuth angle $\varphi_{1a}$, $\varphi_{1b}$ may have the same magnitude as the second maximum gain azimuth angle $\varphi_{2a}$, $\varphi_{2b}$, and the first maximum gain 49a, 49b may have the same magnitude as the second maximum gain 50a, 50b.

Each radar sensor arrangement 4a, 4b is mounted at the corresponding first maximum gain azimuth angle $\varphi_{1a}$, $\varphi_{1b}$ such that each first maximum gain 49a, 49b is directed in the forward direction D along a corresponding first maximum gain extension 51a, 51b, such that an overlapping part 56 of the antenna radiation pattern 47a, 47b is formed in front of the vehicle, in the forward direction D.

According to some aspects, the first maximum gain extensions 51a, 51b are mutually parallel.

Each second maximum gain 50a, 50b is then directed laterally along a corresponding second maximum gain extension 52a, 52b, such that objects that are positioned in a certain lateral field of view are detected. The boresight extensions 46a, 46b will be directed where no relevant detections are considered to occur.

According to some aspects, the magnitude of the maximum gain azimuth angles $\varphi_{1a}$, $\varphi_{1b}$, $\varphi_{2a}$, $\varphi_{2b}$ are equal, and may furthermore for example have a magnitude of about 30.

The combination of the two antenna radiation patterns 47a, 47b where each first maximum gain 49a, 49b is directed in the forward direction D provides an overlap that enables overlap processing of the radars. Overlap processing means that both antenna radiation patterns 47a, 47b are overlaid to improve the quality of the combined radar image. This works best with capturing raw data from both sensors simultaneously and then computing the data.

In the following a more detailed example of the transmitter arrangement 8a, 8b and the receiver arrangements 11a, 11b will be provided. Only the first transmitter arrangement 8a and the first receiver arrangements 11a will be discussed, but it is again to be understood that the second transmitter arrangement 8b and the second receiver arrangement 11b have a similar design.

Figure 5:
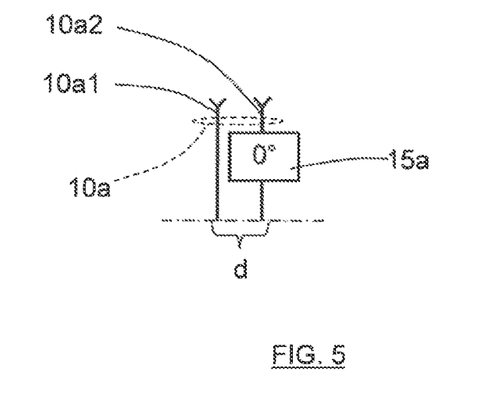
FIG. 5 shows transmitter antenna devices in a first mode of operation.
Figure 6:
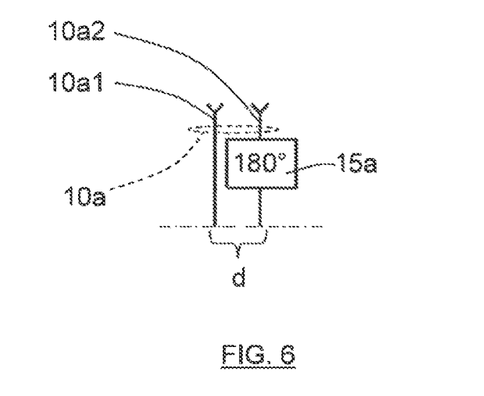
FIG. 6 shows transmitter antenna devices in a second mode of operation.

With reference to FIG. 4, FIG. 5 and FIG. 6, the first transmitter arrangement 8a further includes a phase switch 15a connected between the signal generator 9a and the second transmitter antenna device 10a2. The phase switch 15 is arranged to switch between 0° phase shift, as illustrated in FIG. 5 and FIG. 7, and 180° phase shift, as illustrated in FIG. 6 and FIG. 8.

Figure 7:
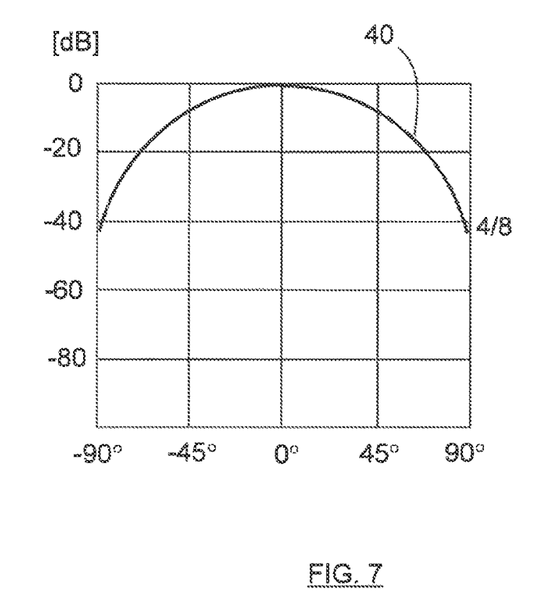
FIG. 7 shows a first antenna radiation pattern.
Figure 8:
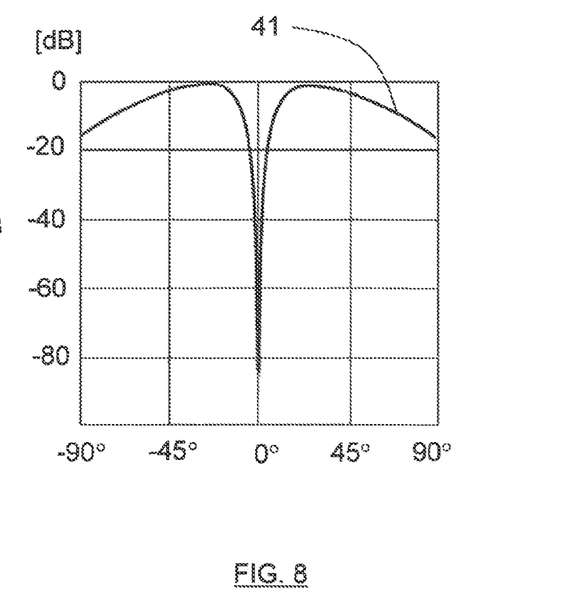
FIG. 8 shows a second antenna radiation pattern.
Figure 9:
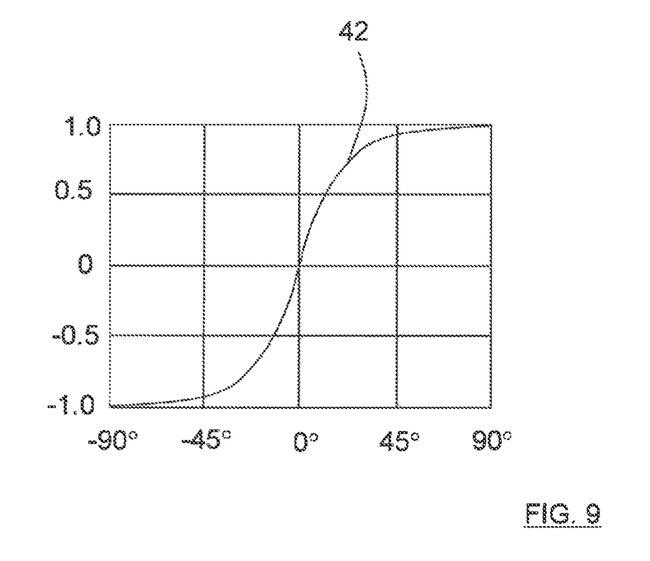
FIG. 9 shows a graph of additive sensing ratio (ASR)

FIG. 7 shows a first relative antenna radiation pattern 40 with magnitude in dB on the y-axis and azimuth angle on the x-axis. FIG. 8 shows a second relative antenna radiation pattern 41 with magnitude in dB on the y-axis and azimuth angle on the x-axis. The relative antenna radiation patterns 40, 41 are to be regarded as indicative of a principle, not as mathematically exact.

With the phase switch 15a in the 0° setting as illustrated in FIG. 5, the radiated energy is focused towards boresight, at 0° in the first relative antenna radiation pattern 40 in FIG. 7, which constitutes a sum pattern 40. With the phase switch 15a in the 180° setting as illustrated in FIG. 6, the radiated energy has a deep notch in boresight, at 0° in the second relative antenna radiation pattern diagram 41 in FIG. 8, which constitutes a delta pattern 41.

In the latter case, the pole at 0° in the delta pattern 41 is important to distinguish object position from being on the left or right side of the first radar sensor arrangement 4a.

The sum pattern 40 is thus obtained by feeding both transmitter antenna devices 10a1, 10a2 in phase, while the delta pattern 41 is obtained feeding both transmitter antenna devices 10a1, 10a2 out of phase with each other, here with a mutual 180° phase difference.

It is desirable that sidelobes, including grating lobes, are suppressed as much as possible.

When a target object 5 has been detected, its delta azimuth angle in the delta pattern 41 will be estimated. Furthermore, it is supposed that the complex amplitude of the target object 5 is available for both the sum pattern 40 and the delta pattern 41.

A bearing calculation will be based on the theory of an amplitude-sensing monopulse (ASM). The name derives from the fact that the method is theoretically capable of obtaining a target object's angles using only one (mono) pulse. It uses the amplitude characteristic (magnitude) of its antenna pattern to determine an angular position of a detected target object. Due to the sum pattern 40 and the delta pattern 41 being mirror-symmetric to its corresponding boresight, the phase conditions are used to obtain the sign of the azimuth angle of the target object 5.

An additive sensing ratio (ASR) is defined as:

$$ASR = \frac{M_\Delta - M_\Sigma}{M_\Delta + M_\Sigma} \quad (1)$$

Here, $M_\Sigma$ corresponds to the magnitude of the sum pattern 40, and $M_\Delta$ corresponds to the magnitude of the delta pattern 41. With reference to FIG. 5, the ASR 42 is schematically indicated as a function of azimuth angle. Note that the symmetric antenna characteristics imply that the corresponding ASR function does not behave strictly monotonic. Consequently, a unique angle cannot be assigned to a particular ASR phase. The phase characteristics of the relative antenna radiation patterns 40, 41 are therefore used to determine a unique angle.

With reference to FIG. 10, showing the first receiver antenna arrangement 13a that includes the first receiver antenna device 13a1, the second receiver antenna device 13a2, the third receiver antenna device 13a3 and the fourth receiver antenna device 13a4, there is a certain spacing k·λ between adjacent receiver antenna devices 13a1, 13a2, 13a3, 13a4. λ is a wavelength corresponding to a center frequency of a desired frequency band, and k is a constant that is chosen for desired functionality.

The spacing k·λ has an important significance for the antenna design. On the one hand, a high degree of angular resolution and accuracy is desired, which requires a large antenna distance. On the other hand, a high degree of unambiguous range is also desire, which requires a relatively small antenna spacing. In some cases, both resolution and accuracy may be reduced in favor of a reasonable unambiguous range.

In practice, additional restrictions arise from a relatively small antenna aperture. First to mention would be an undesired crosstalk between the receiver antenna devices 13a1, 13a2, 13a3, 13a4. The intensity of this crosstalk follows inherently a function of the antenna separation. This behavior may create unpredictable nonlinearities in the bearing processing. Another disadvantage of a relatively small antenna aperture is limited antenna gain, and consequently the SNR of the received signal.

Another aspect of the antenna design is the influence of the vehicle environment, such as for example bumper integration, on the radar performance. A variety of factors should therefore be considered; for example uncontrolled wave propagation, unintentional mode creation, etc. All of these effects also have negative impact on the processing. However, a relatively large antenna spacing mitigate some harmful external effects.

According to some aspects, the constant k is chosen to be about 1.5-2.0.

With reference to FIG. 5 and FIG. 6, for the adjacent transmitter antenna device 10a1, 10a2 there is a spacing d that according to some aspects has a magnitude of about 1.5·λ.

Figure 11:
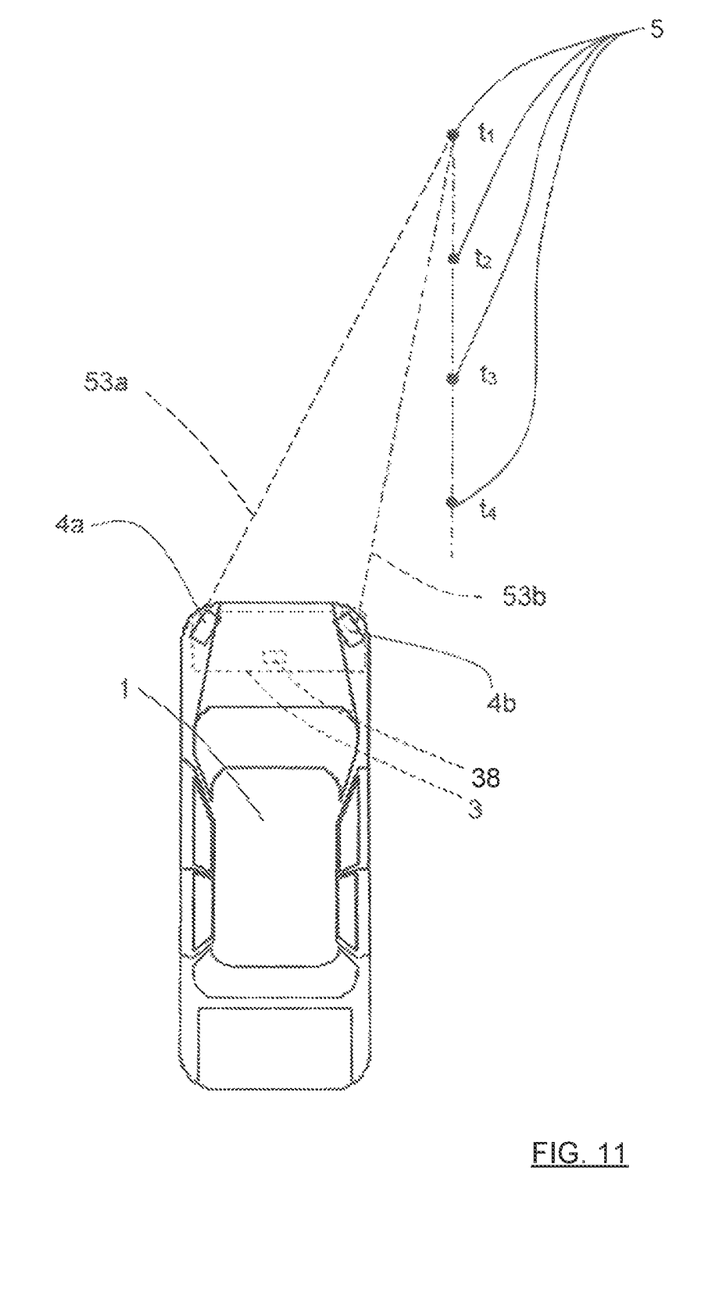
FIG. 11 shows a schematic top view of the vehicle with its sensor configuration and timing.

As shown in FIG. 11, the target object 5 is detected at different times $t_1$, $t_2$, $t_3$, $t_4$ as it is approached by the vehicle 1. By synchronizing the two radar sensor arrangements 4a, 4b, for example by use of the main control unit 38, the number of detections can be doubled for a target, if it is in the field of view of both sensor arrangements 4a, 4b. If the measurement time also is known, the signals can be integrated coherently, which gives the radar system an SNR improvement up to about 3 dB. Furthermore, the sampling rate is doubled and the Doppler Nyquist is increased by a factor of 2. In practice, this leads to that the unambiguity of relative velocities is doubled.

For two sensor arrangements 4a, 4b that are spatially separated, the radial velocity of a moving target behaves differently as indicated with a first target line 53a and a second target line 53b. When the relative mounting positions are known, the angular position relative to the vehicle and therefore a lateral position can be extracted from the difference of the radial velocity of the separate sensor arrangements 4a, 4b. The radial velocity can be determined by a Doppler frequency or the radial distance change versus time. In this way, for example, a pedestrian that moves between parked/motionless cars can be more easily detected by analyzing Doppler speed differences.

Exactly how the above steps are accomplished may vary, the example disclosed above is only an example, and the processing may be performed in any suitable processing unit.

The main control unit 38 may be formed by one or more separate or integrated control units. Each radar sensor arrangement 4a, 4b may also include one control unit with an appropriate bus interface circuit or a fully integrated solution.

As indicated in FIG. 1, the vehicle 1 includes a safety control unit 54 and safety system 55, for example an emergency braking system and/or an alarm signal device. The safety control unit 54 is arranged to control the safety system 55 in dependence of input from the radar system 3. Such input may be input via the main control unit 38.

The present disclosure is not limited to the examples above, but may vary freely within the scope of the appended claims. For example, the ramp time $T_r$ does not have to be the same for the first chirp signal 4a and the second chirp signal 4b.

Each ramp may be configured as an up-ramp as described, or a down-ramp, or some combination of both such as saw-tooth. The magnitude of the first frequency $f_{start}$ may thus exceed the magnitude of the second frequency $f_{stop}$.

Other kinds of FMCW signals and FMCW signal configurations are also conceivable, as well as other types of Doppler radar signals. Other types of radar systems are also conceivable; not only FMCW radar systems are conceivable. Pulse radar, FSK (frequency-shift keying) or CW (continuous wave) waveform are also conceivable like all other kinds of suitable modulation techniques.

Furthermore, there may be any number of transmitter antenna devices 10a1, 10a2 and receiver antenna devices 13a1, 13a2, 13a3, 13a4, but there is at least two transmitter antenna devices for each transmitter antenna arrangement 10a, 10b and at least two receiver antenna devices for each receiver antenna arrangement 13a, 13b.

Each antenna device 10a1, 10a2; 13a1, 13a2, 13a3, 13a4 may for example be constituted by one antenna element or by an array of antenna elements.

The radar system may be implemented in any type of vehicle such as cars, trucks and buses as well as boats and aircraft.

The schematics of vehicle radar systems are simplified, only showing parts that are considered relevant for an adequate description of the present disclosure. It is understood that the general design of radar systems of this kind is well-known in the art.

Furthermore, no devices that are arranged to use the acquired target information are shown, but many different such devices are of course conceivable; for example a warning and/or collision avoidance system.

The ADC arrangement and the DSP arrangement should each one be interpreted as having a corresponding ADC or DSP functionality, and may each be constituted by a plurality of separate components. Alternatively, each ADC arrangement may be integrated in one ADC chip, and each DSP arrangement may be included in one DSP chip.

Generally, the hardware used to generate the radar signal may be arranged to be powered down when it is not needed.

Beamforming may be used, for example in the form of digital beamforming (DBF) but other types of beamforming are conceivable. According to an aspect, an ASM transmitter is combined with an analog beamforming receiver. In this case the steering would be achieved with phase-shifter components in between the antenna elements. This technique is also known as 'Phased Array Radar'.

When a phase shift of 180° is mentioned, the mathematically exact figure is not intended, but a phase shift within what is practically obtainable that provides a sum pattern 40 and a delta pattern 41. Therefore, in practice, for delta pattern signals, radar signals 6a, 6b are arranged to be transmitted from at least a first transmitting antenna device 10a1 out of phase with radar signals 6a, 6b arranged to be transmitted from at least a second transmitting antenna device 10a2.

According to some aspects, only one type of radar sensor arrangement 4a, 4b is manufactured for cost reasons. When mounted, they will be mounted upside-down relative to each other in order to enable the antenna devices to face the same direction. This will also result in that the antenna devices will be positioned at different heights from the ground which enables acquiring elevation data, not only azimuth data.

Azimuth multipath can be used for increasing the ability to determine distances between different parts of an object in front of the vehicle 1, since transmitted signals from the radar sensor arrangements 4a, 4b will be reflected back along several different paths. Each radar sensor arrangement 4a, 4b can be used for detecting multipath signals that have been transmitted from the other radar sensor arrangement, increasing the amount of available data.

Other wordings such as parallel are not intended to be understood as mathematically exact, but within what is practically obtainable.

Other examples of the magnitude of the maximum gain azimuth angles $\varphi_{1a}$, $\varphi_{1b}$, $\varphi_{2a}$, $\varphi_{2b}$ are of course possible, for example about 60° or about 45°.

Generally, the present disclosure relates to a vehicle radar system 3 comprising a first radar sensor arrangement 4a and a second radar sensor arrangement 4b, where each radar sensor arrangement 4a, 4b includes at least two transmitter antenna devices 10a1, 10a2 and at least two receiver antenna devices 13a1, 13a2, 13a3, 13a4, where each receiver antenna device 13a1, 13a2, 13a3, 13a4 has a corresponding boresight extension 46a, 46b that is perpendicular to an antenna plane 57. Each receiver antenna device 13a1, 13a2, 13a3, 13a4 has a corresponding antenna radiation pattern 47a, 47b, where each antenna radiation pattern 47a, 47b has a lower gain 48a, 48b in its boresight extension 46a, 46b than at a certain corresponding first maximum gain azimuth angle $\varphi_{1a}$, $\varphi_{1b}$ with respect to the corresponding boresight extension 46a, 46b, where there is a first maximum gain 49a, 49b, where each radar sensor arrangement 4a, 4b is mounted such that each first maximum gain 49a, 49b is directed along a corresponding first maximum gain extension 51a, 51b, such that an overlap part 56 of the antenna radiation patterns 47a, 47b is formed.

According to an example embodiment, the first maximum gain extensions 51a, 51b are mutually parallel.

According to an example embodiment, the radar sensor arrangements 4a, 4b are arranged to be mounted to a vehicle 1, having a forward direction D, such that the first maximum gain extensions 51a, 51b extend in the forward direction D, and such that the corresponding first maximum gain azimuth angle $\varphi_{1a}$, $\varphi_{1b}$ is formed between the corresponding boresight extension 46a, 46b and the corresponding first maximum gain extension 51a, 51b.

According to an example embodiment, each antenna radiation pattern 47a, 47b has a lower gain 48a, 48b in its boresight extension 46a, 46b than at a second maximum gain azimuth angle $\varphi_{2a}$, $\varphi_{2b}$ where there is a second maximum gain 50a, 50b.

According to an example embodiment, the overlap part 56 enables overlap processing.

According to an example embodiment, the vehicle radar system 3 is arranged to synchronize the two radar sensor arrangements 4a, 4b such that the number of detections are doubled for a target object 6 when the target object 6 is in the field of view of both radar sensor arrangements 4a, 4b.

According to an example embodiment, the vehicle radar system 3 is arranged to determine an angle position relative to the vehicle for a target object 6 from a difference of the radial velocity of the separate sensor arrangements 4a, 4b.

According to an example embodiment, the transmitter antenna devices 10a1, 10a2 are arranged to transmit by use of a first relative antenna radiation pattern 40 and by use of a second relative antenna radiation pattern diagram 41, where the first relative antenna radiation pattern 40 is obtained by feeding two transmitter antenna devices 10a1, 10a2 in phase, while the second relative antenna radiation pattern diagram 41 is obtained by feeding two transmitter antenna devices 10a1, 10a2 out of phase with each other.

According to an example embodiment, the vehicle radar system 3 is constituted by a radar system where the transmitter antenna devices 10a1, 10a2 are arranged to transmit Frequency Modulated Continuous Wave (FMCW) chirp signals 6a, 6b.

Generally, the present disclosure also relates to a method for a vehicle radar system 3 that uses at least two receiver antenna devices 13a1, 13a2, 13a3, 13a4, where each receiver antenna device 13a1, 13a2, 13a3, 13a4 has a corresponding boresight extension 46a, 46b that is perpendicular to an antenna plane 57. For each receiver antenna device 13a1, 13a2, 13a3, 13a4, the method includes radiating an antenna radiation pattern 47a, 47b that has a lower gain 48a, 48b in its boresight extension 46a, 46b than at a certain corresponding first maximum gain azimuth angle $\varphi_{1a}$, $\varphi_{1b}$ with respect to the corresponding boresight extension 46a, 46b, where there is a first maximum gain 49a, 49b, where each radar sensor arrangement 4a, 4b is mounted to a vehicle 1 such that each first maximum gain 49a, 49b is directed along a corresponding first maximum gain extension 51a, 51b, such that an overlap part 56 of the antenna radiation patterns 47a, 47b is formed.

According to an example embodiment, the first maximum gain extensions 51a, 51b are mutually parallel.

According to an example embodiment, the radar sensor arrangements 4a, 4b are mounted to the vehicle 1, having a forward direction D, such that the maximum gain extensions 51a, 51b extend in the forward direction D, and such that the corresponding first maximum gain azimuth angle $\varphi_{1a}$, $\varphi_{1b}$ is formed between the corresponding boresight extension 46a, 46b and the corresponding first maximum gain extension 51a, 51b.

According to an example embodiment, each antenna radiation pattern 47a, 47b has a lower gain 48a, 48b in its boresight extension 46a, 46b than at a second maximum gain azimuth angle $\varphi_{2a}$, $\varphi_{2b}$ where there is a second maximum gain 50a, 50b.

According to an example embodiment, a first relative antenna radiation pattern 40 is obtained by feeding two transmitter antenna devices 10a1, 10a2 in phase, while a second relative antenna radiation pattern diagram 41 is obtained by feeding two transmitter antenna devices 10a1, 10a2 out of phase with each other.

According to an example embodiment, the vehicle radar system 3 is constituted by a radar system where the transmitter antenna devices 10a1, 10a2 are used for transmitting Frequency Modulated Continuous Wave (FMCW) chirp signals 6a, 6b.

While the above description constitutes the preferred embodiment of the present invention, it will be appreciated that the invention is susceptible to modification, variation and change without departing from the proper scope and fair meaning of the accompanying claims.

The invention claimed is:

1. A vehicle radar system comprising:
a first radar sensor arrangement and a second radar sensor arrangement,
wherein each of the radar sensor arrangements includes at least two transmitter antenna devices and at least two receiver antenna devices,
wherein each of the at least two receiver antenna devices of the corresponding radar sensor arrangement defines a corresponding boresight extension that is perpendicular to a corresponding antenna plane,
wherein each of the at least two receiver antenna devices of the corresponding radar sensor arrangement defines a corresponding antenna radiation pattern, the antenna radiation pattern having a lower gain in the corresponding boresight extension than at a certain corresponding first maximum gain azimuth angle with respect to the corresponding boresight extension, where there is a first maximum gain at the first maximum gain azimuth angle, wherein each of the radar sensor arrangements is mounted such that the corresponding first maximum gain is directed along a corresponding first maximum gain extension, such that an overlap part of the antenna radiation patterns is formed,
wherein the vehicle radar system is arranged to determine an angle position relative to the vehicle radar system for a target object from a difference of radial velocity of the first radar sensor arrangement and the second radar sensor arrangement,
wherein the at least two transmitter antenna devices of the first radar sensor arrangement define a corresponding boresight extension and are arranged to switch between transmitting a first relative antenna radiation pattern and a second relative antenna radiation pattern,
wherein the first relative antenna radiation pattern has a maximum gain at the corresponding boresight extension, and
wherein the second relative antenna radiation pattern has a notch at the corresponding boresight extension.

2. The vehicle radar system according to claim 1, wherein the radar sensor arrangements are arranged to be mounted to a vehicle, having a forward direction, such that the first maximum gain extension extends in the forward direction, and such that the corresponding first maximum gain azimuth angle is formed between the boresight extension and the first maximum gain extension.

3. The vehicle radar system according to claim 1, wherein the antenna radiation pattern for each of the receiver antenna devices has a lower gain in the corresponding boresight extension than at a second maximum gain azimuth angle where there is a second maximum gain.

4. The vehicle radar system according to claim 1, wherein the overlap part enables an overlap processing.

5. The vehicle radar system according to claim 1, wherein the vehicle radar system is arranged to synchronize the first radar sensor arrangement and the second radar sensor arrangement such that a number of detections are doubled for the target object when the target object is in a field of view of both of the first radar sensor arrangement and the second radar sensor arrangement.

6. The vehicle radar system according to claim 1, wherein the at least two transmitter antenna devices are arranged to transmit a first relative antenna radiation pattern and a second relative antenna radiation pattern, where the first relative antenna radiation pattern is obtained by feeding two of the transmitter antenna devices in phase, while the second relative antenna radiation pattern is obtained by feeding two of the transmitter antenna devices out of phase with each other.

7. The vehicle radar system according to claim 1, wherein the at least two transmitter antenna devices are arranged to transmit a Frequency Modulated Continuous Wave (FMCW) chirp signal.

8. A method for a vehicle radar system that includes a first radar sensor arrangement and a second radar sensor arrangement, the method comprising:
receiving signals by the first radar sensor arrangement and the second radar sensor arrangement, wherein each of the radar sensor arrangements includes at least two transmitter antenna devices and at least two receiver antenna devices, wherein each of the at least two receiver antenna devices of the corresponding radar sensor arrangement defines a corresponding boresight extension that is perpendicular to a corresponding antenna plane, wherein each of the at least two receiver antenna devices of the corresponding radar sensor arrangement defines a corresponding antenna radiation pattern that has a lower gain in the corresponding boresight extension than at a certain corresponding first maximum gain azimuth angle with respect to the boresight extension, where there is a first maximum gain at the first maximum gain azimuth angle, wherein each of the radar sensor arrangements is mounted such that the corresponding first maximum gain is directed along a corresponding first maximum gain extension, such that an overlap part of the antenna radiation patterns is formed;
feeding the at least two transmitter antenna devices of the first radar sensor arrangement to switch between transmitting a first relative antenna radiation pattern and a second relative antenna radiation pattern; and
determining an angle position relative the vehicle radar system for a target object from a difference of radial velocity of the first radar sensor arrangement and the second radar sensor arrangement,
wherein
the at least two transmitter antenna devices of the first radar sensor arrangement define a corresponding boresight extension,
the first relative antenna radiation pattern has a maximum gain at the corresponding boresight extension, and
the second relative antenna radiation pattern has a notch at the corresponding boresight extension.

9. The method according to claim 8, wherein the radar sensor arrangements are mounted to the vehicle, having a forward direction, such that the maximum gain extension extends in the forward direction, and such that the corresponding first maximum gain azimuth angle is formed between the corresponding boresight extension and a first maximum gain extension.

10. The method according claim 8, wherein the antenna radiation pattern for each of the receiver antenna devices has a lower gain in the corresponding boresight extension than at a second maximum gain azimuth angle where there is a second maximum gain.

11. The method according to claim 8, further comprising:
feeding the at least two transmitter antenna devices of the first radar sensor arrangement to switch between transmitting a first relative antenna radiation pattern and a second relative antenna radiation pattern, wherein the first relative antenna radiation pattern is obtained by feeding two of the transmitter antenna devices in phase, and the second relative antenna radiation pattern is obtained by feeding two of the transmitter antenna devices out of phase with each other.

12. The method according to claim 8 further comprising: transmitting, using the transmitter antenna devices of the vehicle radar system, Frequency Modulated Continuous Wave (FMCW) chirp signals.

13. The vehicle radar system according to claim 1, wherein one of the first maximum gain extensions of the at least two receiver antenna devices of the first radar sensor arrangement and one of the first maximum gain extensions of the at least two receiver antenna devices of the second radar sensor arrangement are parallel.

14. The method according to claim 8, wherein one of the first maximum gain extensions of the at least two receiver antenna devices of the first radar sensor arrangement and one of the first maximum gain extensions of the at least two receiver antenna devices of the second radar sensor arrangement are parallel.

* * * * *